Aug. 11, 1931.   H. BRÜSSOW   1,818,192
POTATO DIGGING MACHINE
Filed April 17, 1930

Inventor:
Hermann Brüssow

Patented Aug. 11, 1931

1,818,192

UNITED STATES PATENT OFFICE

HERMANN BRÜSSOW, OF BARNIMSCUNOW, GERMANY, ASSIGNOR OF ONE-HALF TO HERMANN WOLFGRAMM AND ONE-HALF TO CARL BERGMANN, BOTH OF MILWAUKEE, WISCONSIN

POTATO DIGGING MACHINE

Application filed April 17, 1930, Serial No. 445,150, and in Germany May 2, 1929.

In order when harvesting to lift the potatoes out of the earth potato diggers have been hitherto employed which engage in the earth with inclined tines and push the potatoes out of the ground in lateral direction. It happens however that, especially in the case of heavy soil, the earth sods stick between the tines thereby impeding a perfect working of the entire machine. Moreover there is no certainty that the potatoes which are dug remain visible on the surface of the field as they are often partially again covered with earth.

This invention relates to a potato digger in which the disadvantages above mentioned are overcome in the simplest manner. The tines, also used in this case, fastened on a beam set at an angle to the direction of travel of the machine, are so shaped that the potatoes gradually slide up thereon, being at the same time conveyed to the side, and it is possible for the earth lifted to slide out over the tines. The lifted potatoes do not fall directly back onto the field, but they are caught by gridlike juxtaposed bars which travel close above the surface of the field and form a drag rake. Any earth still adhering to the potatoes falls through between the bars, and the potatoes finally slide off the bars and remain lying on the surface of the ground. The distance between the beam on which tines are fastened and the ground can be varied by means of known devices and the drag rake can also be set at different heights.

An embodiment of the invention is illustrated by way of example in the accompanying drawings in which Fig. 1 shows the potato digger in side elevation the tines engaging in the ground.

On the frame $a$ which has a pole $b$, wheels $f$, mounted in known manner on a crank axle $e$, are arranged by means of a segment $c$ and hand lever $d$ so that the distance of the frame $a$ from the ground can be varied by operating the hand lever $d$. A beam $h$ arranged at an angle to the direction of travel is rigidly fastened on an extension $g$ of the frame $a$, and tines $i$ pointed at their free ends are mounted parallel on the beam $h$, these tines forming together an inclined plane. It is particularly important, that the tines $i$ project beyond the beam $h$ and are fastened therein with their ends preferably bent to a semi-circle. The beam $h$ also serves for attaching the drag rake adjustable in vertical direction by means of a support $k$, which rake consists of a transverse rod $l$ and of longitudinal rearwardly directed bars $m$ arranged horizontally like a grid parallel to the direction of travel of the machine. A coulter $n$ is also provided on the machine frame and, when engaging in the ground, ensures a straight running of the machine.

Figure 1:
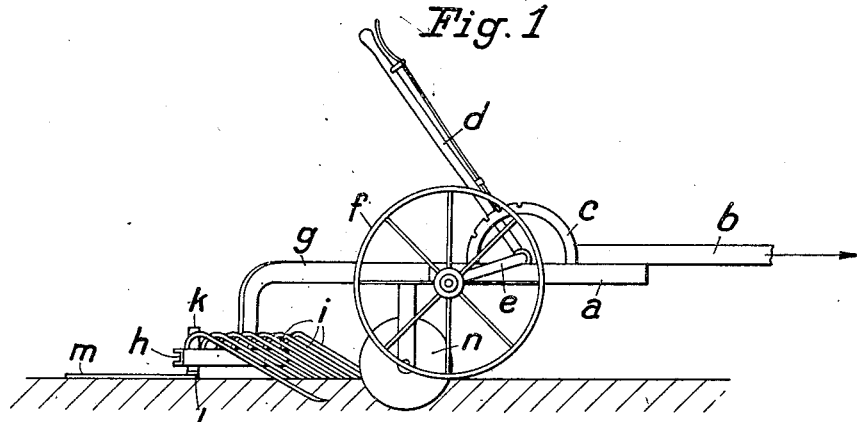
Figure 2:
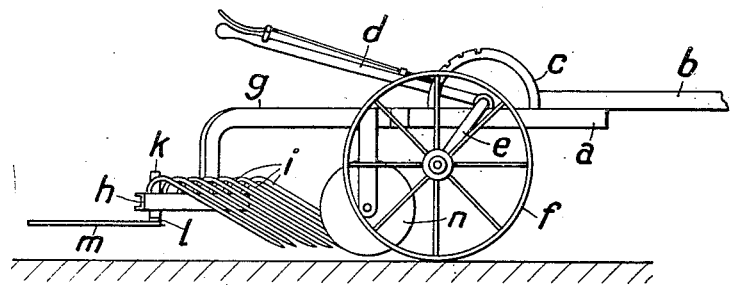
Fig. 2 is a similar view to Fig. 1 the tines being in raised position.
Figure 3:
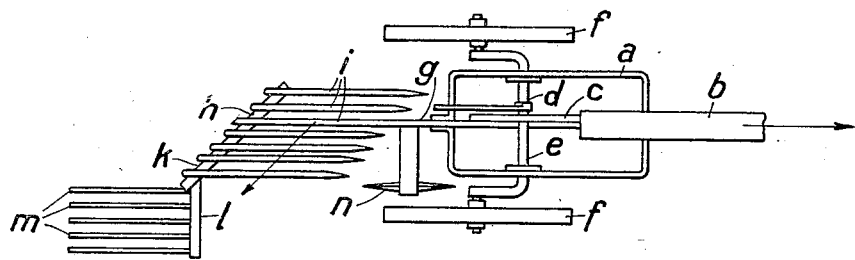
Fig. 3 is a top plan view of Fig. 2.

If it is desired to use the potato digger, the machine frame is first set by means of the hand lever $d$ so that the tines penetrating into the ground (Fig. 1) engage slightly below the potato plants. If the machine is moved forward in the direction of the arrow (Fig. 1), the potato plants slide upwards on the tines $i$, the potatoes separate from the tops and, owing to the girder $h$ being arranged at an angle, slide off from the tines in the direction of the arrow (Fig. 3). They are caught by the drag rake $l$, $m$ which is so set, that it scrapes directly over the surface of the ground. As the machine travels all the earth still adhering to the potatoes finally falls through between the bars of the drag rake and the potatoes then lie perfectly cleaned in a wide row behind the potato digger. A portion of the earth lifted by the tines $i$ already falls back between the tines and a portion is forced together with the potato tops up to the upper bent over ends of the tines. The earth cannot stick at this point as in the known constructions, but slides over the tines and drops onto the field.

I claim:—

1. A potato digging machine, comprising in combination a machine frame vertically adjustable in height, a beam rigidly connected with said frame at an angle to the direction of travel, and parallel tines mounted on said frame forming together an inclined plane having points at the lower ends adapted to engage in the soil the upper ends of said tines being preferably bent semi-circularly projecting above the upper edge of said beam.

2. A potato digging machine as specified in claim 1, comprising in combination with the beam, a drag rake connected adjustable in vertical direction with said beam on the potato delivery side of the machine, said rake comprising a transverse rod adapted to slide over the ground in the direction of travel of the machine, and rearwardly directed bars arranged juxtaposed in grid-like form on said rod.

3. A potato digging machine as specified in claim 1, comprising in combination with the tines, a guide coulter in front of the tines adapted to engage in the ground.

In testimony whereof I affix my signature.

HERMANN BRÜSSOW.